US012522007B2

(12) United States Patent
Borrell Bayona et al.

(10) Patent No.: US 12,522,007 B2
(45) Date of Patent: Jan. 13, 2026

(54) PRINTING TO TEXTILES

(71) Applicant: Hewlett-Packard Development Company, L.P., Spring, TX (US)

(72) Inventors: Maria Isabel Borrell Bayona, Sant Cugat del Valles (ES); Marina Cantero Lazaro, Sant Cugat del Valles (ES); Diana Canto Estany, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 53 days.

(21) Appl. No.: 18/563,689

(22) PCT Filed: May 24, 2021

(86) PCT No.: PCT/US2021/033821

§ 371 (c)(1),
(2) Date: Nov. 22, 2023

(87) PCT Pub. No.: WO2022/250643

PCT Pub. Date: Dec. 1, 2022

(65) Prior Publication Data

US 2024/0253372 A1 Aug. 1, 2024

(51) Int. Cl.

| | |
|---|---|
| ***B41J 3/407*** | (2006.01) |
| ***B41F 16/02*** | (2006.01) |
| ***B41J 13/00*** | (2006.01) |
| ***B41J 13/10*** | (2006.01) |

(52) U.S. Cl.
CPC ........... *B41J 13/0054* (2013.01); *B41F 16/02* (2013.01); *B41J 3/4078* (2013.01); *B41J 13/103* (2013.01)

(58) Field of Classification Search
CPC ...... B41F 3/4078; B41F 16/02; B41J 13/0054
See application file for complete search history.

(56) References Cited

U.S. PATENT DOCUMENTS 5,288,322 A * 2/1994 Hanna ................. B05B 13/0242 118/301
6,631,985 B2 10/2003 Koizumi et al.
7,765,927 B1 * 8/2010 Liu .......................... B41J 11/06 101/474
9,254,680 B2 2/2016 Takeuchi et al.
9,409,414 B2 * 8/2016 Miller .................... B41J 3/4073
2002/0060728 A1 5/2002 Koizumi et al.
(Continued)

FOREIGN PATENT DOCUMENTS

CN 1088159 A 6/1994
CN 103373081 A 10/2013
(Continued)

*Primary Examiner* — David H Banh
(74) *Attorney, Agent, or Firm* — Jordan IP Law, LLC

(57) ABSTRACT

An example method comprises providing a textile on which a printing fluid is to be deposited at a printing station and supporting the textile by a support member. The support member is to advance the textile through the printing station. The example method comprises increasing a dimension of the support member to increase a dimension of the textile, and advancing the textile toward the printing station by advancing the support member toward the printing station.

6 Claims, 5 Drawing Sheets

(56) References Cited

U.S. PATENT DOCUMENTS

| | | | | |
|---|---|---|---|---|
| 2003/0197750 | A1* | 10/2003 | Iwatsuki | B41J 3/28 347/19 |
| 2005/0068364 | A1* | 3/2005 | Kayanaka | B41J 2/165 347/23 |
| 2013/0278697 | A1 | 10/2013 | Takeuchi et al. | |
| 2013/0340484 | A1* | 12/2013 | Turner | B41F 15/18 28/165 |
| 2016/0031206 | A1* | 2/2016 | Budd | A43D 8/003 29/559 |
| 2017/0352092 | A1* | 12/2017 | Mitchell | G06T 15/503 |
| 2018/0201034 | A1 | 7/2018 | Turner | |
| 2018/0370258 | A1 | 12/2018 | Hoffman, Jr. et al. | |
| 2019/0168520 | A1* | 6/2019 | Hoffman, Jr. | B41F 15/18 |

FOREIGN PATENT DOCUMENTS

| | | | |
|---|---|---|---|
| CN | 107672323 | A | 2/2018 |
| CN | 206953780 | U | 2/2018 |
| RU | 2158202 | C2 | 10/2000 |
| SU | 601183 | A1 | 4/1978 |

* cited by examiner

PRINTING TO TEXTILES

BACKGROUND

Some printers are to print to a textile, for example by depositing a printing fluid thereon.

BRIEF DESCRIPTION OF DRAWINGS

Examples will now be described, by way of non-limiting example, with reference to the accompanying drawings, in which.

DETAILED DESCRIPTION

Figures 1A, 1B, 2A, 2B, 3A, 3B:
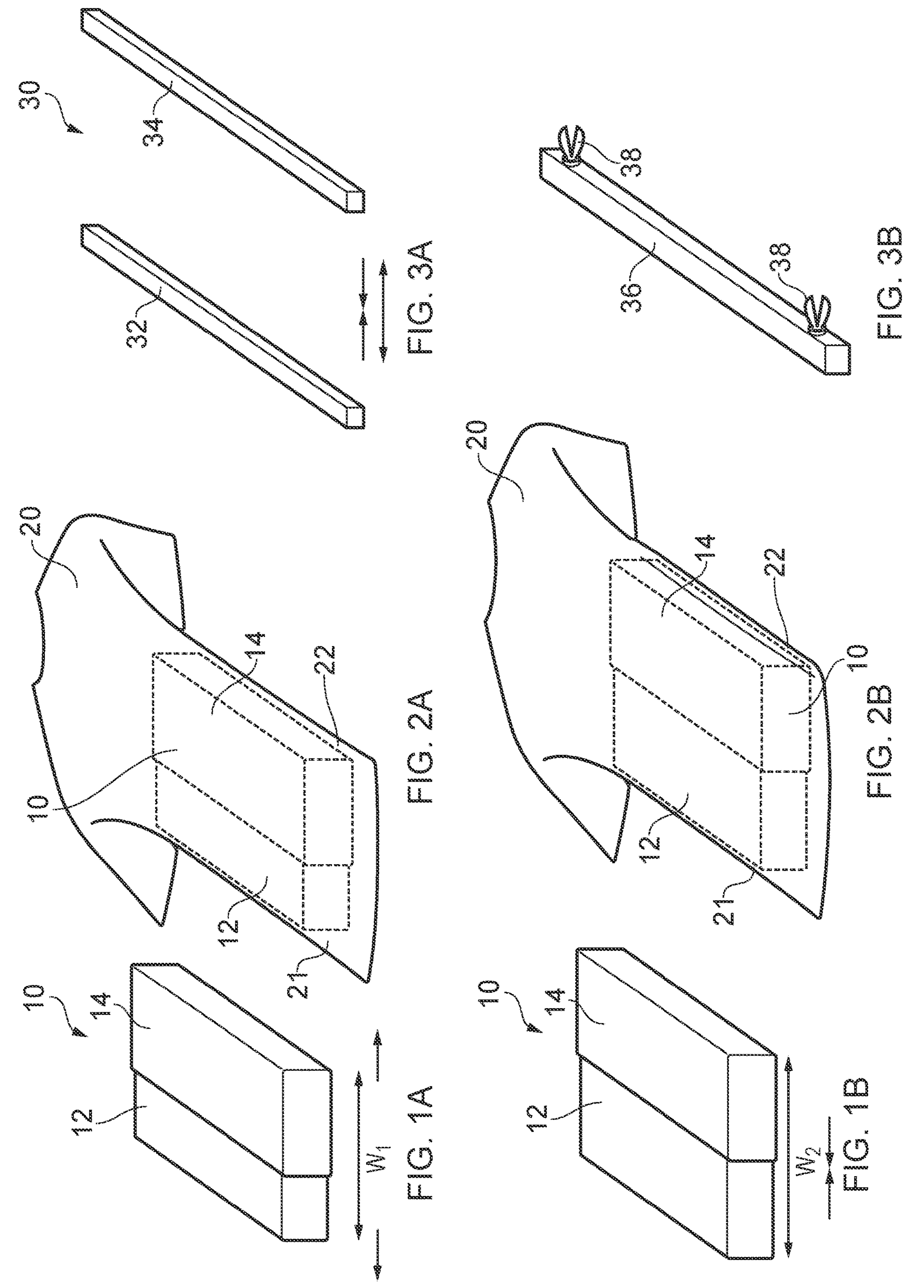
FIGS. 1A and 1B are simplified schematics of an example support.
FIGS. 2A and 2B are simplified schematics of an example support supporting a textile.
FIG. 3A is a simplified schematic of an example support.
FIG. 3B is a simplified schematic of an example support member.

In printing to textiles a printing fluid may be deposited onto the textile. This may be to print an image thereon (e.g. an inked image) or may be to colour a portion, or all, of the textile (which may be considered printing an image of a single colour, or multiple colours, to the textile). For printing fluid to transfer an image, or colour, to the textile resulting in a good print quality (or high-quality garment) the transfer should achieve a good saturation, uniformity, and feel. However, sometimes the three-dimensional structure of the textile may present challenges in that certain printing fluids may not be able to properly penetrate the different layers of the textile.

For example, a textile may comprise a network of interlocking fabric (and/or yarn and/or thread and/or strands etc.) formed by interweaving and/or interleaving and/or intertwining and/or interlacing and/or knitting etc. the fabric (and/or yarn etc.) into layers. These are sometimes called "warps" and "wefts." For example, the network of fabric may comprise two distinct sets of fibres (and/or yarns etc.) of a textile material such as fabric and/or cloth etc. that are interweaved (and/or interleaved etc.) at right angles to form the textile, with the longitudinal threads being termed the warp and the lateral threads being termed the weft. The warp and weft may be termed the "threads" of the textile and may comprise a textile material e.g. a fabric material and/or yarn and/or cloth etc. Hence, a textile may comprise a network of interwoven and/or interleaved and/or intertwined and/or interlocked and/or interlaced and/or knitted threads and/or yarns and/or strands and/or fibres etc., e.g. of cloth and/or fabric and/or textile material and/or chord and/or string etc. The textile may comprise a fabric and/or a garment and/or a cloth and/or clothing etc. The textile may comprise a woven and/or a non-woven material. The threads (or yarns or fibres etc.) of the textile may comprise a natural or synthetic material.

During some printing processes, the textile material may lay on a flat surface and the threads of the textile may be close to each other, such that it may be difficult for any droplets of printing fluid deposited thereon to properly penetrate the textile threads. The textile may not therefore have the depth or richness or uniformity of colour that was intended. As a result, the textile may have poor colour coverage, low saturation and may be perceived as being of inferior quality.

Some examples herein relate to stretching the textile prior to a printing process, e.g. by increasing a dimension of the textile. This will expand the distance between adjacent threads (e.g. warps and/or wefts) of the textile to allow a better penetration of a printing fluid to colour the textile. In turn, this will improve the print quality and/or uniformity of the final textile and this may be achieved using the same amount of printing fluid (e.g. without using more printing fluid to achieve the increased quality). The stretching of the textile may be by a predetermined amount, which may be, for example a stretch of between 0 and 2 cm. The textile may be stretched in the textile-advance direction (e.g. the media advance direction) and/or the direction perpendicular to the direction of the textile advance (e.g. the crossweb direction). Stretching the textile may bring the textile into a tight, or taut, state, e.g. from a loose, or slack state. Because the dimension of the textile is larger, according to some examples, an image to be transferred to the textile may be enlarged, e.g. by a processor for example a processor executing machine-readable instructions, and the image that is transferred to the textile may comprise the re-sized image. In this way, despite the stretching of the textile, the final image to be printed to the textile may be sized as originally intended so that the stretching does not affect the printing process, but the resulting textile still has the better uniformity, saturation and feel. Re-sizing the image may therefore comprise stretching and/or distorting the image, for example, in the same direction, or directions, in which the textile is stretched (e.g. advance and/or crossweb).

According to other examples, a support, or base, to support the textile and to increase a dimension of the textile is provided. The support, or base, may comprise first and second components that may be movable relative to one another, such as movable away from or toward one another, for example in a translatable (or slidable) manner and/or in a rotatable manner. Each component may be to retain part of a textile such that an increase in the textile's dimension may be accomplished by increasing a dimension of the support. The dimension of the support that is increasable may be the distance between the first and second components of the support. The first and second components may each be to retain a textile by contact or by engagement between the textile and a gripping element of the component, such as gripping fingers or a toothed component to grip the textile by penetrating its fibres. The dimension of the support to be increased may comprise a width, length, depth, or height of the support and may correspond to a dimension of the textile in the media advance and/or the crossweb direction. Once the dimension of the support has been increased such that the dimension of the textile has been increased, the support may then advance the textile toward a printing station for an image to be printed thereon. Hence, some examples herein relate to a support having an adjustable dimension, or an adjustable support, for a textile.

FIGS. 1A and 1B show a support 10 for a textile, the support 10 being to advance the textile through a printing station of a printer. The textile and printing station are not shown in FIGS. 1A and 1B but will be described later with reference to other figures. The support 10 comprises a first support member 12 for supporting a first portion of the textile and a second support member 14 for supporting a second portion of the textile. As shown by the arrows in FIG. 1B, the first and second support members 12, 14 are movable relative to each other. When the first and second support members 12, 14 are movable relative to each other it will change a dimension of the support 10. For example, the support 10 as shown in FIG. 1A has a width W1 whereas, in FIG. 1B, it has width W2 with W2>W1 as in the FIG. 1B example, relative to the 1A example, the first support member 12 has moved away from the second support member 14. Hence, the support 10 may be regarded as a support 10 of adjustable dimension. The first and second support members 12, 14 being movable relative to one another, such that a dimension of the support 10 is adjustable may mean that a dimension of the textile is adjustable (or changeable etc.) when first and second portions of the textile are supported by the first and second support members 12, 14. This is shown in more detail in FIGS. 2A and 2B. Although denoted as a width, the dimension of the support 10 that is increased by virtue of the relative movement of the first and second support members 12, 14 may equally be a depth, height, or length of the support 10. To achieve the relative movement, in some examples one of the first and second support members 12, 14 may be movable relative to the other or, in other examples, both of the first and second support members 12, 14 may be movable. As shown in FIG. 1, and as will be discussed later, one of the support members 12, 14 of this example is receivable (e.g. translatably or slidably receivable) in the other to adjust the dimension of the support 10.

FIGS. 2A and 2B show the support 10 supporting a textile 20. Both figures show the support 10 being received inside the textile 20 which, in this example comprises a shirt (or T-shirt), with the support 10 being shown in phantom lines to indicate that the support 10 is located inside the garment 20. In the FIG. 2A example the support 10 is as shown in FIG. 1A when the support 10 has width W1. In this example, a dimension (e.g. the width) of the support 10 is small enough such that the shirt 20 sits loose about the support 10. In the FIG. 2B example the support 10 is as shown in FIG. 1B when the support 10 has width W2>W1. In this example, a dimension (e.g. the width) of the support 10 has increased such that the shirt 20 is taut, or tight, or pulled, or pulled taut/tight etc. about the support 10. Therefore, the increased width of the support 10 has caused an increase in the width of the garment 20. Put another way, first and second portions of the textile 20 (see a left portion 21 and a right portion 22) may each be respectively supported by the first and second support members 12, 14 such that when the first and second members 12, 14 are moved relative to one another, these first and second portions 21, 22 are pulled away from one another to increase a dimension of the textile 20. The dimension of the textile 20 is therefore adjustable since the distance between the first and second portions 21, 22 of the textile is adjustable. As will be explained later, the support 10 may be to support and/or grip and/or retain a textile 20 to advance it through a printing station of a printer. The support 10 may be to increase the dimension of the textile 20 prior to a print operation such that the textile is pulled tight and/or taut etc. to improve the print quality of an image to be formed thereon.

FIG. 3A shows another support 30 for a (not shown) textile. The support 30 may comprise the support 10 as described above. As for the support 10, the support 30 is to advance the textile through a printing station of a printer and comprises a first support member 32 for supporting a first portion of the textile and a second support member 34 for supporting a second portion of the textile. As shown by the arrows, the first and second support members 32, 34 are movable relative to each other. When the first and second support members 32, 34 are movable relative to each other it will change a dimension of the support 30 and therefore (as will be explained below with reference to FIG. 4) will change a dimension of a textile retained by the support 30, e.g. as described with reference to FIG. 1.

FIG. 3B shows a support member 36 which may comprise any of the support members described above such as first support members 12, 32 or second support members 14, 34. The support member 36 comprises a gripping element 38. Two sets of gripping elements 38 are shown in FIG. 3B, one provided at either end of the support member 36, by way of one example. Any number of gripping elements 38 (including one gripping element) may be used however, depending on the example. The gripping element 38 is to grip a textile, for example to support or retain the textile for a support (comprising the support member 36), such as support 10 or 30, to retain and advance the textile through a printing station. Then gripping element 38, or each set of gripping elements 38, may comprise a pair of gripping fingers, e.g. biased into a closed configuration, to grip the textile therebetween but, in some examples, a single gripping element or protrusion or finger etc. may be used.

Figure 4A:
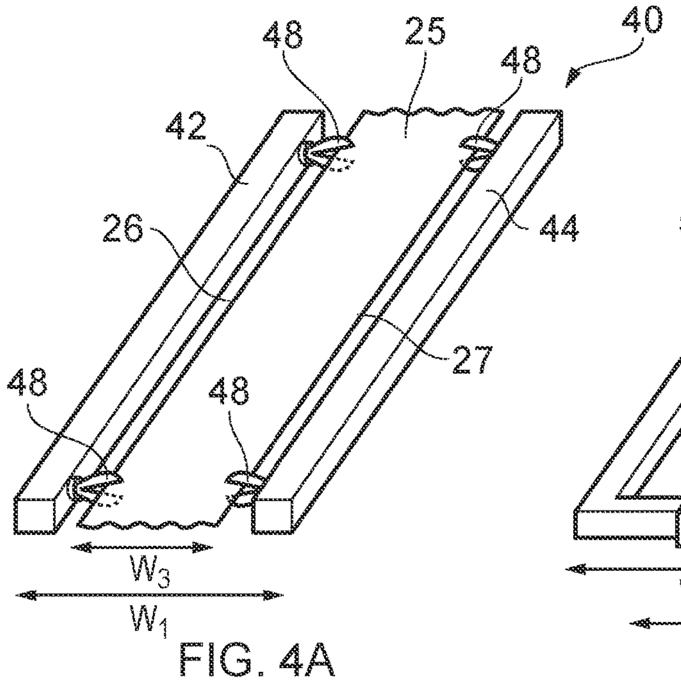
FIGS. 4A and 4B are simplified schematics of an example support supporting a textile.
Figure 4B:
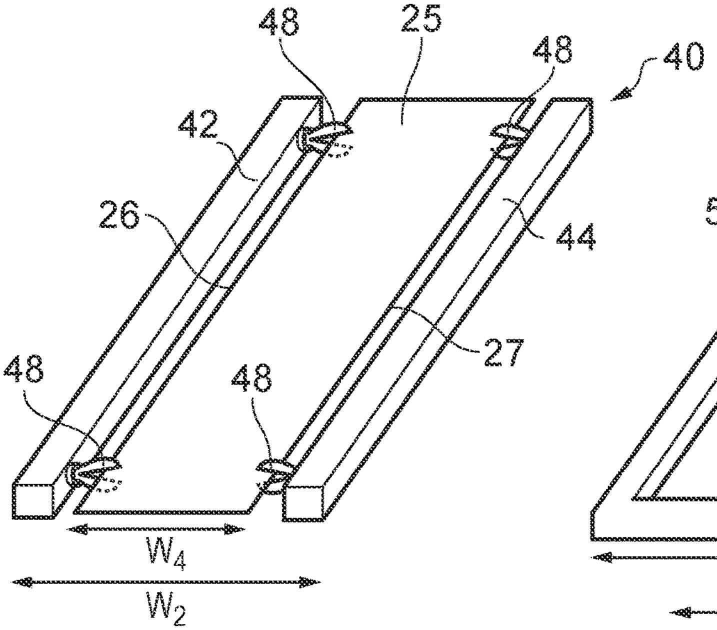

FIGS. 4A and 4B show a support 40 and a textile 25 which, in this example comprises a textile without a closed interior, depicted as a blanket or scarf 25. The support 40 may be as described above with respect to FIGS. 1-3, for example the support 40 may comprise the support 30 of FIG. 3A and may comprise the support member 36 of FIG. 3B. The support 40 is to advance the textile 25 through a printing station of a printer and comprises a first support member 42 for supporting a first portion 26 (e.g. a left hand portion) of the textile 25, and a second support member 44 for supporting a second portion 27 (e.g. a right hand portion) of the textile 25. As shown in FIG. 3A, the first and second support members 42, 44 are movable relative to each other so as to change a dimension of the textile 25 when first and second portions 26, 27 of the textile 25 are supported by the first and second support members 42, 44. For instance, in the FIG. 4A example, the support 40 has width W1 such that the textile 25 has width W3 and, in the FIG. 4B example, the support 40 has width W2, W2>W1, such that the textile 25 has width W4, W4>W3, since, relative to the FIG. 4A example, in the FIG. 4B example, the first support member 42 has moved away from the second support member 44 so as to increase the distance between them (and thereby to increase a dimension, e.g. a width, of the support 40) and thereby to increase a dimension (e.g. a width) of the textile 25. In the FIG. 4A example the textile 25 may be slack whereas in the FIG. 4B example the textile may be tight or taught etc.

As for the FIG. 3B support member 36, each support member 42, 44 of the support 40 comprises a pair of gripping elements 48 (although, in some examples each support member 42, 44 may comprise one gripping element 48) with each pair of gripping elements 48 comprising a pair of gripping fingers, e.g. biased into a closed configuration, to grip the textile therebetween. Each gripping element 48 may comprise a single gripper, or gripping finger etc. in some examples.

Figure 5A:
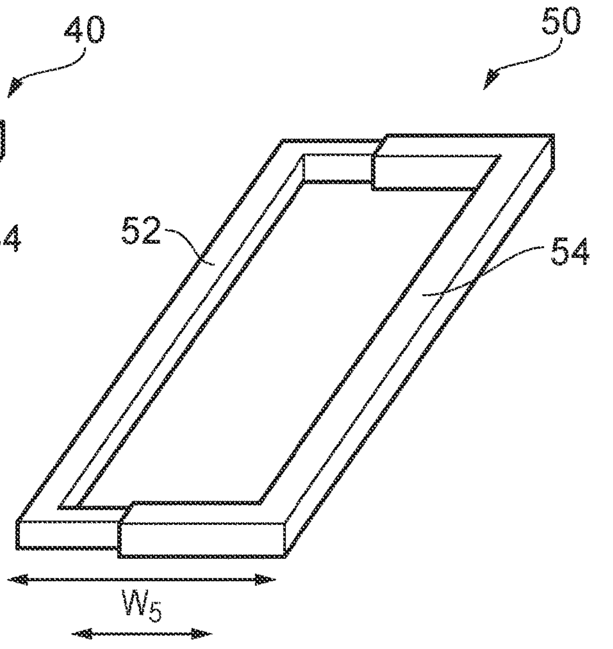
FIGS. 5A and 5B are simplified schematics of an example support.
Figure 5B:
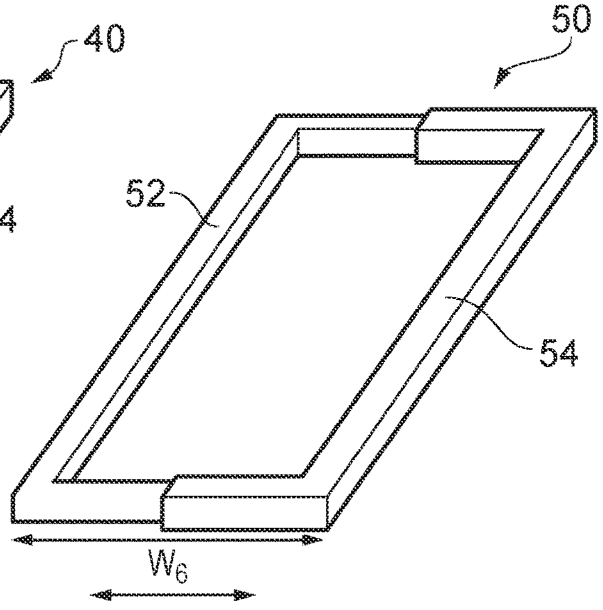

FIGS. 5A and 5B show an example support 50 which may comprise any of the supports 10, 30, 40, or support members, as described above. The support 50 is to advance a (not shown) textile through a printing station of a printer and comprises a first support member 52 for supporting a first portion of the textile and a second support member 54 for supporting a second portion of the textile. As shown by the arrows, the first and second support members 52, 54 are movable relative to each other. When the first and second support members 52, 54 are movable relative to each other it will change a dimension of the support 50. For example, the support 50 as shown in FIG. 5A has a width W5 whereas, in FIG. 5B, it has width W6 with W6>W5 as, in the FIG. 5B example, relative to the 5A example, the first support member 52 has moved away from the second support member 54. Hence, the support 50 may be regarded as a support 50 of adjustable dimension. The first and second support members 52, 54 being movable relative to one another, such that a dimension of the support 50 is adjustable may mean that a dimension of the textile is adjustable when first and second portions of the textile are supported by the first and second support members 52, 54.

The FIG. 1 support 10 was receivable inside a textile (as was shown in FIG. 2) whereas the FIGS. 3 and 4 supports 30, 40 were to retain a textile in between first and second support members of the supports. The FIG. 5 support 50 may comprise the support 10 or may comprise the support 30 or 40. In other words, the support 50 may be receivable inside a textile or garment such as a T-shirt and expanding the dimension of the support 50 (as in FIG. 5B) may expand, e.g. from the inside, a dimension of the textile (as described with reference to FIG. 2), effectively increasing the dimension of the textile from the inside. In another example, the support 50 may be to retain, or grip, a textile in between its first and second support members 52, 54 in which example each support member 52, 54 may comprise a gripping element (e.g. 38, 48 as described above) to retain portion of the textile. Whereas the support 10 is depicted as a solid block and the supports 30 and 40 were depicted as unconnected support members, the support 50 is depicted as a frame having connected first and second frame elements surrounding an opening, or hollow centre. In some examples, the textile may be receivable in the opening between the support members 52, 54 and may be retained therebetween by any of the example ways discussed above.

Due to their shape, the supports 30, 40, 50 may be termed a "frame" or "frame element", or "frame-type" support, and the support members 32, 34, 36, 42, 44, may be termed "frame elements." The support 10 may be termed a "tray" or "tray-type" support.

Referring to back to FIGS. 1A and 1B, to facilitate the relative movement between the support members 12, 14, in this example, a portion of the first support member 12 is receivable in a portion of the second support member 14. The relative movement between the support members 52, 54 of the support 50 of the FIG. 5 example is similarly achieved as, in this example, a portion of the first support member 52 is receivable in a portion of the second support member 54. In these examples, the support may be slidably expandable. However, in other examples, the relative movement between support members may be achieved by another means, such as independent movement between support members (as shown in FIG. 4) or, indeed, another means. For example, a movable (e.g. slidable) connection may join one support member to the other (e.g. one support member may comprise a rail or slide with the other member comprising a roller or wheel receivable and slidable within the rail/slide such that the two members are connected via a drawer or guide rail or runner mechanism or conveyor assembly etc.).

Figure 6A:
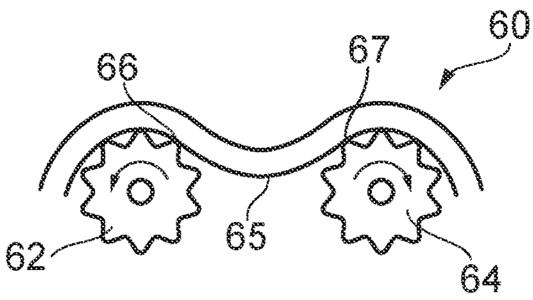
FIGS. 6A and 6B are simplified schematics of an example support.
Figure 6B:
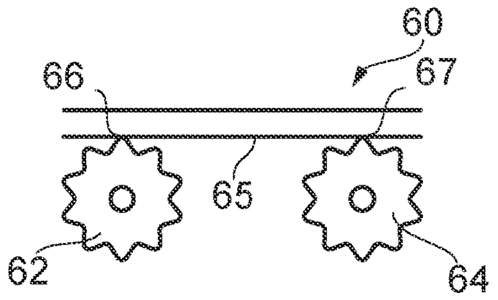

FIGS. 6A and 6B show an example support 60 to advance a textile 65 through a printing station to a printer. The support 60 comprises a first support member 62 for supporting a first portion 66 of the textile 65 and a second support member 64 for supporting a second portion 67 of the textile 65. The first and second support members 62, 64 each comprise a portion of a rotatable member, pictured as a gear-like wheel with a set of teeth, each set of teeth, or each tooth, being to grip the textile 65, e.g. in a penetrative manner, by penetrating an area between fibres of the textile 65. Each of the first and second support members 62, 64 may therefore comprise a tooth of a toothed element (e.g. toothed rotatable element). As each of the first and second support members 62, 64 comprise a portion of a rotatable member, as shown by the arrows, the first and second support members 62, 64 are therefore rotatable relative to each other. When the first and second support members 62, 64 are rotated relative to each other it will change a dimension of the support 60, in that it will change the distance between the support members 62, 64, which will, in turn, change the dimension of the textile 65 supported by the support 60. For instance, each support member (or portion thereof that is gripping the textile 65) has rotated away from the other in FIG. 6B compared to FIG. 6A and, as a result, the respective portions 66, 67 of the textile 65 gripped by the support members have moved away from each other, thereby increasing a dimension of the textile 65 by pulling it. The textile may be pulled taut, or tight, when compared to the FIG. 6A example where it is shown slack.

Figure 7A:
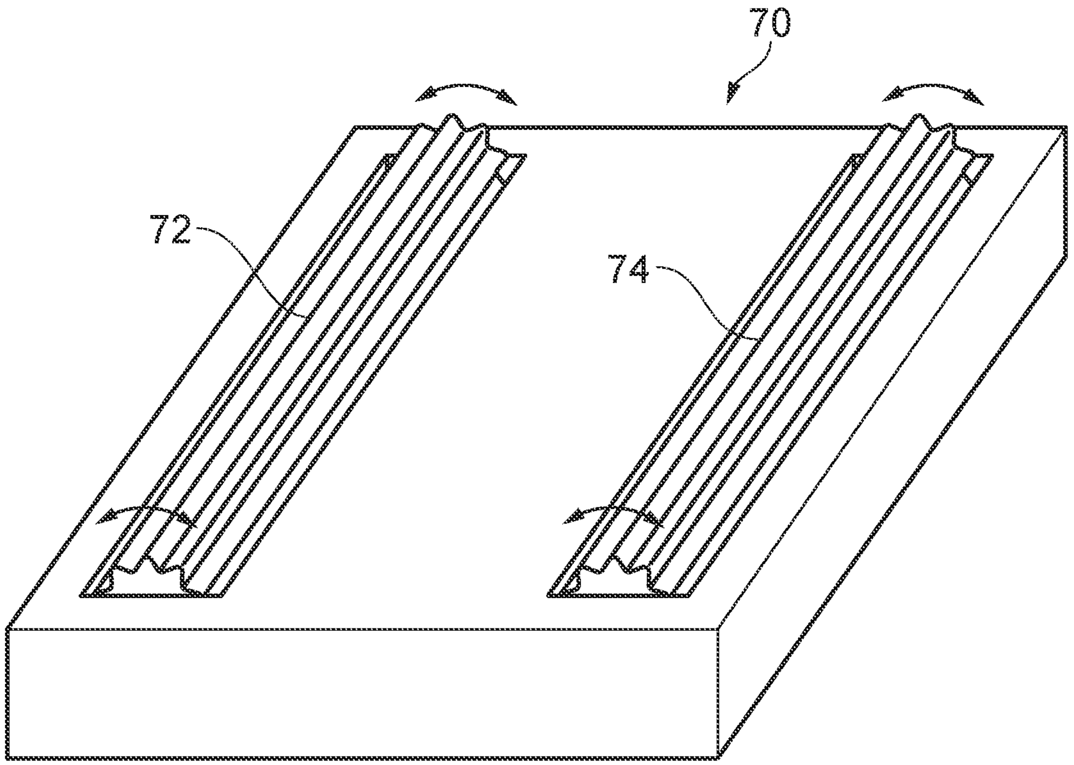
FIGS. 7A and 7B are simplified schematics of an example support.
Figure 7B:
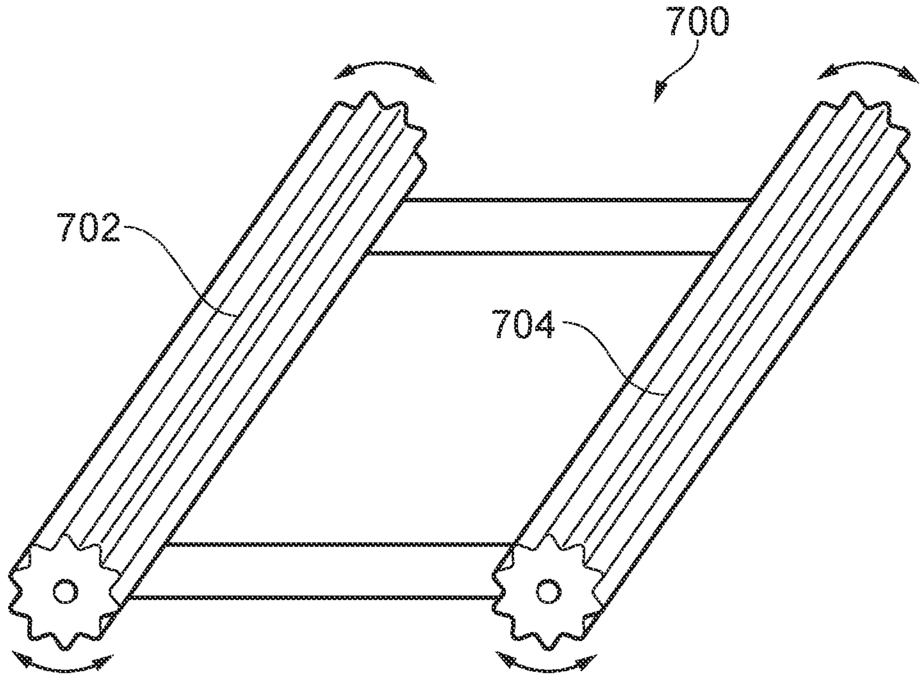

FIGS. 7A and 7B show example supports 70 and 700, each one of which comprises a mechanism for retaining a (not shown) textile similar to that described with reference to FIG. 6. Specifically, each of the supports 70, 700 comprises first and second support members 72, 74, 702, 704, each of which comprise a rotatable element, such as a toothed element, each support member thereby comprising a tooth of a rotatable toothed element, to grip a textile in a penetrative manner. As for FIG. 6, when a tooth penetrates the textile to grip it and is rotated relative to another portion of the textile it will change a dimension of the textile. By way of example, the support 70 of FIG. 7A is of the "tray" design as shown in FIGS. 1 and 2 whereas the support 700 of FIG. 7B is of the "frame" design as shown in FIGS. 3-5. Further, each support element 72, 74, 702, 704 comprises a longitudinal element, such as a bar or shaft, which comprises a continuous profile of gripping teeth. In this way, each support element 72, 74, 702, 704 comprises a rotatable gripping element extending in one direction of the support 70, 700. In the FIG. 7 examples, each rotatable support member 72, 74, 702, 704 extends substantially for a dimension of the support 70, 700, e.g. substantially along its length (or width or depth etc.). This design allows the supports 70, 700 to grip a textile in many places (e.g., grip the textile continuously along a dimension of the textile such as its length or width or depth etc.). The arrows in FIGS. 7A and 7B indicate the rotatable nature of the support members such that, when a textile is retained by the supports 70, 700, rotation of the support members will change a dimension of the textile by moving parts of the textile away from one another.

Figure 8A:
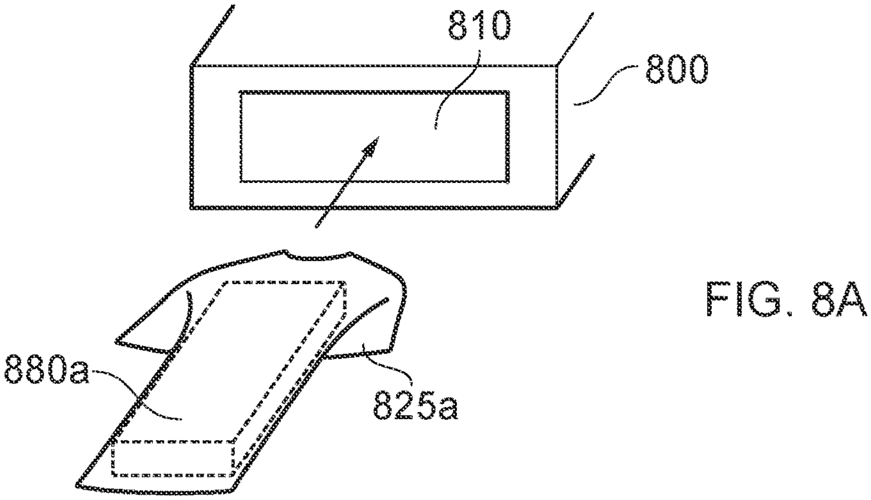
FIGS. 8A, 8B, and 8C are simplified schematics of example supports supporting a textile and advancing the textile toward a printing station.
Figure 8B:
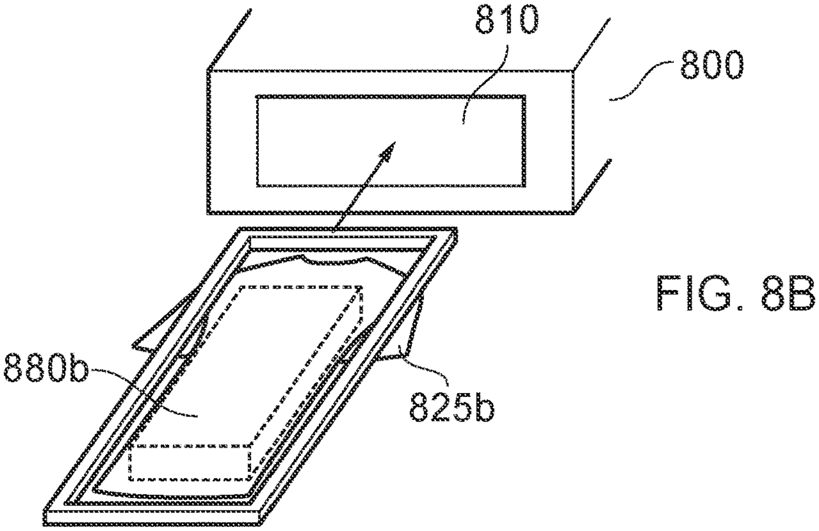
Figure 8C:
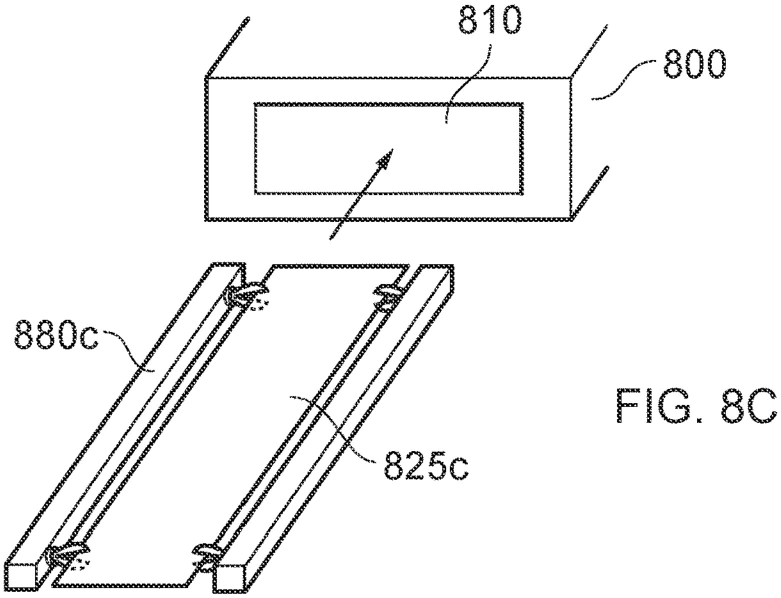

FIGS. 8A-8C show a printer 800 comprising a printing station 810. Each of FIGS. 8A-8C show a textile 825*a-c* being supported by a support 880*a-c* and being advanced toward the printing station 810. FIG. 8A shows a textile 825*a* and support 880*a* as shown in FIGS. 1 and 2 (e.g. in the form of a shirt with the support being of the "tray" type of FIGS. 1 and 2 inside the garment) whereas FIG. 8B shows the same kind of textile (shirt) and support (tray) within the textile, additionally supported by a further support of the "frame" type as shown in FIG. 5. Placing a frame-type support, such as that of FIG. 5, over a textile having a support therein may mean that any increased dimension of the textile (e.g. pulled taut), e.g. resulting from an increased dimension of a support contained therein (e.g. in the manner described with respect to FIG. 2) may be fixed, or set in place, by the further frame-type support being placed over the textile. FIG. 8C shows a textile 825*c* and support 880*c* as shown in FIGS. 3-4 (e.g. in the form of a blanket or scarf with the support being of the "frame" type of having gripping elements, as discussed with reference to FIGS. 3-4) advancing toward the printing station 810.

In other examples, a support, or a support member thereof, may comprise any of the mechanisms described above in combination. For example, in the FIGS. 7A and 7B examples four rotatable elements are provided, each having gripping teeth, which are all depicted as being aligned, or parallel, to stretch a textile in a single direction. However, in other examples, a support may comprise first and second support members, each comprising a toothed wheel, and each being oriented differently, e.g. they may be oriented perpendicularly to one another. In this way, rotating one support member may increase the dimension of a textile in one direction (e.g. the advance direction) and rotating the other support member may increase the dimension of the textile in a different direction, e.g. a perpendicular direction (e.g. the crossweb direction). As for the FIGS. 7A and 7B examples, a support may comprise two sets of support members, each set of support members comprising two toothed wheels that are parallel, but with the wheels of one set being perpendicular to the wheels of the second set. In this way, each set of wheels may, through rotation, pull the textile to increase it's dimension in one direction but when both sets are rotated away from one another the dimension of the textile may be increased in two directions (e.g. crossweb and media advance). In this way, the textile itself may be effectively enlarged by being pulled in more than on direction. In a further example, a support which comprises two support members, one which is slidable (or translatable) away from, and toward, the other (such as that of FIG. 1), may comprise two further support members, one of the further support members being slidable (or translatable) away from, and toward, the other of the further support member. In this further example, one set of support members may be movable relative to one another in a first direction and the other set of support members may be movable relative to one another in a second direction. The first and second directions may be perpendicular such that each set expands the textile in the crossweb or advance direction to enlarge the textile.

In some examples, moving one of the support members relative to another may be achieved under motorised control. In these examples, a motor may be connected to one of the support members, wherein the motor may be controlled to move the support member away from another support member. In other examples, a motor may be connected to each support member and each support member may move, e.g. toward or away from one another, under the control of the motor. In this way, part of the expansion of the supports may be automated. In another example, any of the supports as described above may comprise a resiliently deformable element (such as an anti-slip element) to prevent loose movement of the support, e.g. relative to a surface thereunder. In this way, the provision of a resiliently deformable element may serve to resist unwanted slipping of the support which could result in an unwanted change in the dimension of the textile.

Figure 9:
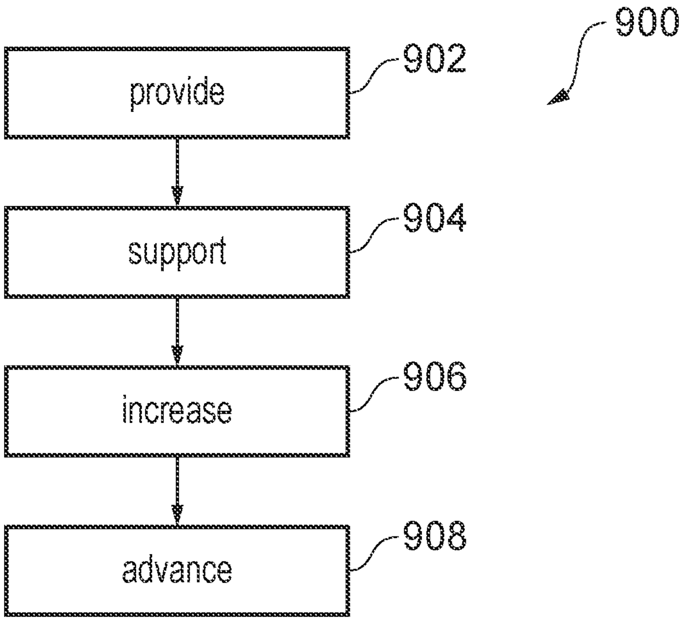
FIG. 9 is a flowchart of an example method.

FIG. 9 shows an example method 900 which may comprise a method of printing to a textile. At block 902, the method comprises providing a textile on which a printing fluid is to be deposited at a printing station. Block 902 may comprise providing a textile such as a garment, fabric, piece of cloth, piece of clothing etc. An image, e.g. an inked image formed from the deposition of printing fluid onto the textile, may be formed on the textile by the deposition of a printing fluid. The image to be formed onto the textile may comprise a colour, e.g. one colour or a colour combination, or a pattern etc.

At block 904, the method comprises supporting the textile by a support member, the support member being to advance the textile through the printing station. The support member may comprise any of the supports or support members as described above with reference to FIGS. 1-8. Therefore, block 904 may comprise supporting the textile by the tray-type support as shown in and as described with reference to FIGS. 1-2, 8A and 8B, or supporting the textile by the frame-type support as shown in and as described with reference to FIGS. 3-5, 8B and 8C, or supporting the textile by both a tray-type and a frame-type support as shown in and described with reference to FIG. 8B. More specifically, block 904 may comprise inserting a support member (such as the support 10) inside the interior of a textile, and/or may comprise placing a textile between two frame elements of a support member (such as the support 30-50) such that the textile is retained by one or both of the two frame elements in a manner described above. In a further example, block 904 may comprise inserting a support member (such as the support 10) inside a textile and then placing a support member (such as support 50) on top of the textile (as in FIG. 8B).

At block 906, the method comprises increasing a dimension of the support member to increase a dimension of the textile. For example, the support member may comprise first and second support members and block 906 may comprise moving the first and second support members relative to each other; or the support member may comprise first and second portions and block 906 may comprise moving a first portion of the support member relative to a second portion of the support member. Both support members may be moved as part of block 906 or one support member may be moved relative to the other. In an example where one support member is receivable inside another, block 906 may comprise moving one support member out of a portion of another support member. Block 906 may therefore comprise increasing a dimension of the textile (e.g. by virtue of increasing the dimension of the support member).

In some examples, moving a first portion of the support member to increase a dimension of the support member may comprises rotating the first portion of the support member (for example as described with reference to FIG. 6 where the movable portion comprised a portion of a rotatable element, in this example the dimension of the support member that is increased corresponds to a distance between the first and second support members). Block 906 may comprise increasing a dimension of the support to increase a dimension of the textile by an amount between 0 and 2 cm. Block 906 may comprise increasing a dimension of the support to increase a dimension of the textile in the advance (e.g. textile or media advance) direction and/or to increase a dimension of the textile in the in the crossweb direction (e.g. the direction perpendicular to the textile or media advance) by increasing a dimension of the support in a direction, or directions, corresponding to the advance and/or crossweb direction. As stated above, as a result of block 906, a dimension of the textile may be increased. As a further result, therefore, of block 906, the spaces in-between the fibres or strands or layers etc. of the textile (e.g. the warp and weft) may be increased such that any printing fluid subsequently deposited onto the textile may properly penetrate the textile.

At block 908, the method comprises advancing the textile toward the printing station by advancing the support member toward the printing station. Block 908 may further comprise depositing printing fluid onto the textile at the printing station. Therefore, block 908 may comprise advancing a textile toward a printing station when the textile has an increased dimension (its dimension being increased by virtue of the support's dimension being increased at block 906) and depositing a printing fluid onto the textile having the increased dimension, resulting in a better deposition of fluid and a more uniform coverage resulting in a better print quality.

Figure 10:
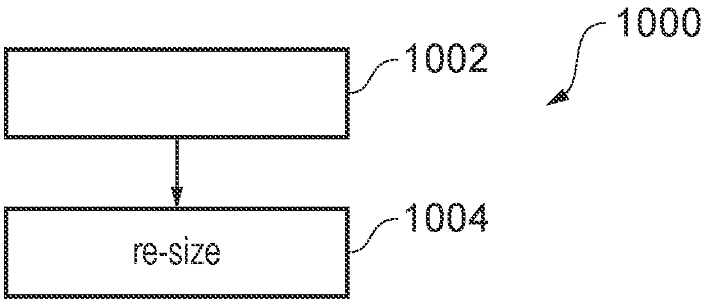
FIG. 10 is a flowchart of an example method.

FIG. 10 shows an example method 1000 which may comprise a method of printing to a textile. The method 1000 comprises a method of transferring an image (e.g. a colour image or colours or a pattern) to the textile and comprises the method 900 as described above with respect to FIG. 9. At block 1002 the method 1000 comprises the method 900 but method 1000 comprises a further block 1004 at which the image is re-sized, e.g. by a processor such as a processor of a computer or a printer, to modify the dimensions of the image that is to be transferred to the textile. The method 1000 may then comprise printing (or transferring) the image to the textile, e.g. by a printer operating on print instructions, e.g. by causing the deposition of printing fluid toward and onto the textile, according to the re-sized image (whose dimensions were determined at block 1004). Block 1004 may comprise re-sizing the image by an amount corresponding to an amount that the dimension of the textile was increased, and/or may comprise re-sizing the image by an amount corresponding to an amount that the dimension of the support was increased.

With reference again to FIGS. 1-8, these figures also depict an example base (e.g. any one of the supports) for retaining a textile and for advancing a textile through a printer (e.g. in the manner described above). The base comprises first and second sides (e.g. see the support members 12, 14 or support members 32, 34, etc.). Each side is to retain a portion of the textile such as first and second opposing ends of a shirt (as depicted in FIG. 1) or first and second sides of a blanket or scarf (as depicted in FIG. 4), with respective portions of the first and second sides being movable away from, and toward, each other so that the distance between the first and second sides is adjustable, such that the base is to adjust a dimension of a textile retained by the first and second sides of the base. As discussed above, in some examples, one (or both) of the movable portions of the first and sides may comprise a rotatable element (such as those described above with respect to FIGS. 6-7), in which examples the rotatable element may comprise a projection (such as a tooth) to grip the textile. As discussed with reference to FIGS. 1 and 5, the movable portion of the movable one of the first and second sides may be receivable in a portion of the other one of the first and second sides (which itself may be movable or non-movable). One or both of the first and second sides may comprise an attachment member to hold part of the textile. The attachment member may comprise any of the mechanisms discussed above (such as a gripping element like a gripper or a pair of gripping fingers etc.) or any other mechanism.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

providing a textile on which a printing fluid is to be deposited at a printing station;

placing the textile in between first and second portions of a support member so that the textile is supported by the support member, wherein each of the first and second portions include a gripping element to grip the textile between the first and second portions;

supporting the textile by the support member, the support member to advance the textile through the printing station;

increasing a dimension of the support member to increase a dimension of the textile; and advancing the textile toward the printing station by advancing the support member toward the printing station.

2. The method of claim 1, wherein increasing the dimension of the support member to increase a dimension of the textile comprises:

moving the first portion of the support member relative to the second portion of the support member.

3. The method of claim 1, wherein an image is to be transferred to the textile at the printing station and wherein the method further comprises:

re-sizing, by a processor, the image to modify the dimensions of the image that is to be transferred to the textile.

4. A support for a textile, the support to advance the textile through a printing station of a printer, the support comprising:

a first support member for supporting a first portion of the textile; and a second support member for supporting a second portion of the textile, wherein the first and second support members are at least partially receivable in a portion of the textile, wherein the first and second support members are movable relative to each other so as to change a dimension of the textile when first and second portions of the textile are supported by the first and second support members, wherein a portion of one of the first and second support members is receivable in a portion of the other support member.

5. A base for retaining and advancing a textile through a printer, the base comprising:

first and second rotatable sides, each rotatable side being to retain a portion of the textile, wherein a portions of the first or second rotatable side is movable away from, and toward, the other rotatable side so that the distance between the first and second rotatable sides is adjustable, such that the base is to adjust a dimension of a textile retained by the first and second rotatable sides of the base.

6. The base of claim 5 wherein the the first and second rotatable sides each comprise a projection to grip the textile.

* * * * *